Sept. 5, 1967  F. L. MOSELEY  3,339,427

MILL TABLE FEED MECHANISM

Filed Aug. 16, 1965  2 Sheets-Sheet 1

INVENTOR.
FRANCIS L. MOSELEY

By Fraser and Bogucki

ATTORNEYS

Sept. 5, 1967     F. L. MOSELEY     3,339,427

MILL TABLE FEED MECHANISM

Filed Aug. 16, 1965     2 Sheets-Sheet 2

INVENTOR.
FRANCIS L. MOSELEY

By Fraser and Bogucki

ATTORNEYS

United States Patent Office 3,339,427
Patented Sept. 5, 1967

3,339,427
MILL TABLE FEED MECHANISM
Francis L. Moseley, 700 Flintridge,
Pasadena, Calif. 91103
Filed Aug. 16, 1965, Ser. No. 480,203
9 Claims. (Cl. 74—472)

This invention relates to mechanical drive mechanisms and more particularly involves a disengageable mechanism for driving a rotary feed device in a selected direction.

Various types of power tools and other similar machinery have a number of adjustments which are made by the operator in the course of using the tool. Typically, most of these adjustments are made by hand by the operator, and a few are made automatically. The present invention involves a disengageable mechanism which can be used to adapt those adjustments normally operated by hand for optional power control. The mechanism is particularly useful where a shaft must be rotated or a gear driven intermittently in order to effect the adjustment.

An example of a power tool which lends itself readily to optional automatic adjustments by such a mechanism is a milling machine. A milling machine table is equipped with feed apparatus which serves to position the material to be milled at desired locations on the table and secure it there. The feed apparatus is operated by a hand feed control which comprises various gears and shafts operated by a hand crank. While the necessary table adjustments can be made with the hand crank, such adjustments can often be made much more rapidly and effectively by a motor driven device. This is particularly true in the case of large adjustments requiring many rotations of the hand crank in one direction or another. Also in situations where the positioning of the table requires that frequent adjustments, both large and small, be made, it is desirable that the table be power fed at various different speeds so that the table can be fed relatively rapidly for large adjustments and relatively slowly for minor ones.

Along with the desirability of a mechanism to power drive the table at various different speeds, it is also desirable that the hand feed control remain operable by hand for very minor adjustments. This requires that the hand crank remain unobstructed so that the operator may have ready access to it, and also that the power mechanism be disengageable from the hand feed control so as not to make the hand crank difficult or impossible to turn. One of the biggest problems in employing a power feed mechanism which is disengageable from the hand feed control is to provide for quick, positive reengagement when it is desired to use the mechanism. Finally, it is desirable that a power drive mechanism be easily mountable on the machine in the vicinity of the hand feed control with a minimum of additional parts and alterations.

It is therefore a general object of the present invention to provide a power feed mechanism which can be used to drive a manually adjustable device.

It is a more specific object of the invention to provide a power driven mechanism which may be used in conjunction with a hand feed control for setting up a workpiece on a milling machine.

It is a further object of this invention to provide a power feed mechanism that can readily be connected to the hand controls of machinery for optional power operation.

It is a still further object of this invention to provide a power feed mechanism as an accessory to hand controlled machinery that can be adjusted for different speeds of operation.

It is an additional object of the present invention to provide a disengageable power feed mechanism which is capable of rapidly and positively engaging with or disengaging from a gear driven machine control.

In brief, particular arrangements in accordance with the invention may comprise a disengageable power feed mechanism having a casing which serves to contain most of the various parts and to enable the mechanism to be easily mounted in conjunction with the hand feed control of a power tool. The mechanism is adapted to couple to a driven shaft within the hand feed control of the tool. In accordance with one aspect of the invention, the casing of the mechanism is adapted to fit over the hand feed control shaft and yet is so positioned that the hand crank and calibration dial associated with the hand feed control may be utilized in conventional fashion. A pair of gears are mounted in operative relationship to transmit power from a motor shaft to the hand feed control shaft with the gears being disengageable and re-engageable in accordance with selected of a control lever. In accordance with an aspect of the invention, the control lever may be positioned to engage the gears, even though the gears may be blocked from moving into engagement. In such a case, engagement is effected as soon as one gear is rotated, since the retractable gear is urged into engagement by a resilient element when the control lever is positioned to produce engagement. A gear shaft coupled to one of the gears is driven by a reversible motor operative to rotate the gear shaft in opposite directions as required. In accordance with a further aspect of the invention, the circuit to energize the motor is also controlled by the control lever, thus providing for extremely simple control of the mechanism by movement of the lever from a neutral position to either "left" or "right" in order to effect powered drive of the hand feed shaft in the selected direction at a selected speed. The invention also provides a variable range of motor speeds with a speed control circuit which may be set at a selected speed within a given range. The motor operates at the selected speed in either direction whenever the control lever is in an "engaged" position.

In one particular arrangement in accordance with the invention, a cam coupled to the control lever is provided with two distinct camming surfaces for both moving the retractable gear in and out of engagement with its mating gear and controlling a pair of switches for energizing the motor circuit for rotation in the selected direction. A spring-retained lever follows the first of the camming surfaces to urge the retractable gear toward engagement when the control lever is moved out of the neutral position. A compression spring absorbs relative movement between the retractable gear and the lever so that the limits on spacing tolerances between the various elements is reduced and also so that the control lever may be moved to an "engaged" position, even though gears might be blocked temporarily, as by encountering a position in which the gear teeth abut together and block engagement until one of the gears can be rotated slightly. Such rotation occurs as soon as the motor is energized, which in turn occurs when the control lever is placed in an "engaged" position.

A better understanding of the invention may be gained from the following detailed description, taken in conjunction with the accompanying drawings, wherein like elements have been given corresponding designations and in which.

Figure 1:
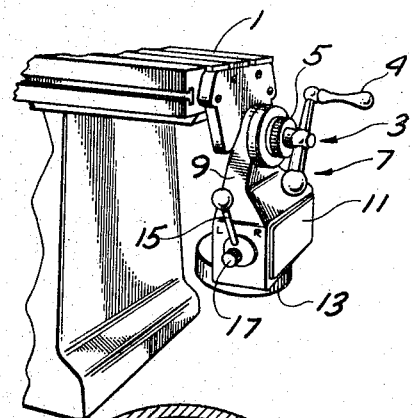
FIG. 1 is a perspective view of a milling machine table feed mechanism installed in its operative position with the hand feed control of a milling machine table.

Referring now to FIG. 1, a portion of a milling machine table 1 is shown. It will be understood that the invention is not limited to such a use but that it is shown and described in this context by way of illustration only. The table 1 is equipped with a hand feed control 3 which is geared to the table 1 and operated by a hand crank 4 so that the operator can manually position the piece of material to be worked by the machine. An indicator or calibration dial 5 is shown connected to the hand feed control 3 to provide a visual indication to the operator of incremental movements of the table. A milling machine table feed mechanism 7 is connected to the hand feed control 3. The milling machine table feed mechanism 7 has a casing 9 which contains most of the various operative components within. It is noted that the casing 9 is shaped in a manner so as not to impede the access to or movement of the hand crank 4. The right side of the casing 9 has a plate 11 which can be easily removed to provide access to the inside of the milling machine table feed mechanism 7 without the need for disassembling it completely. A circular bottom 11 of the casing 9 is provided to contain the gears coupling directly to the motor shaft. Mounted on the front side of the casing 9 is a control lever 15 and a potentiometer knob 17. The control lever 15 is conveniently located so as not to interfere with the hand crank 4, and is within easy access of the machine operator. The control lever 15 normally is placed in a neutral position as shown in FIG. 1. When in this position the milling machine table feed mechanism 7 is mechanically disengaged from the hand feed control 3, and the machine operator can use the hand crank 4 without interference. The control lever 15 is moved to the left or to the right of the neutral position to proivde left or right feed of the table 1. The potentiometer knob 17 selects the motor speed and therefore determines the feed rate of the table 1.

Figure 2:
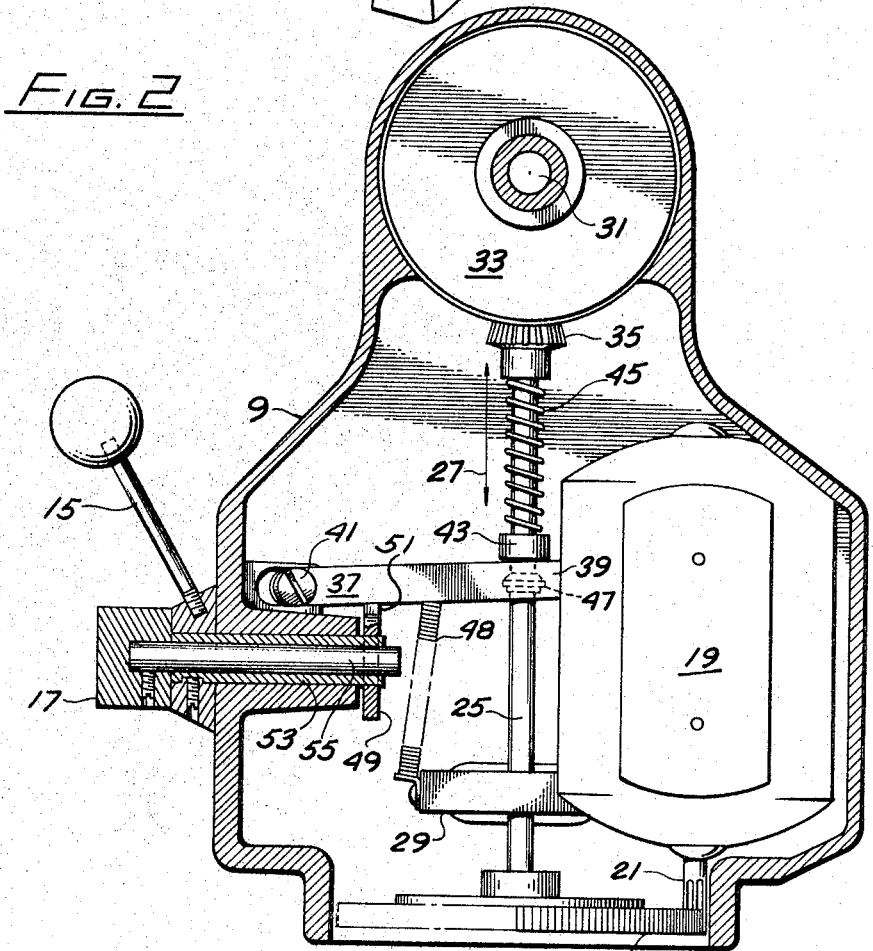
FIG. 2 is a section of the right side of the milling machine table feed mechanism.

Referring now to FIG. 2 it is noted that the casing 9 encloses a motor 19, on the shaft of which is a motor gear 21. A gear shaft 25, slidable axially up and down as shown by the arrow 27, is driven by the motor 19 via a step-down gear 23. A mounting bracket 29 serves to hold the gear shaft 25 in place and to allow it to slide axially.

Figure 3:
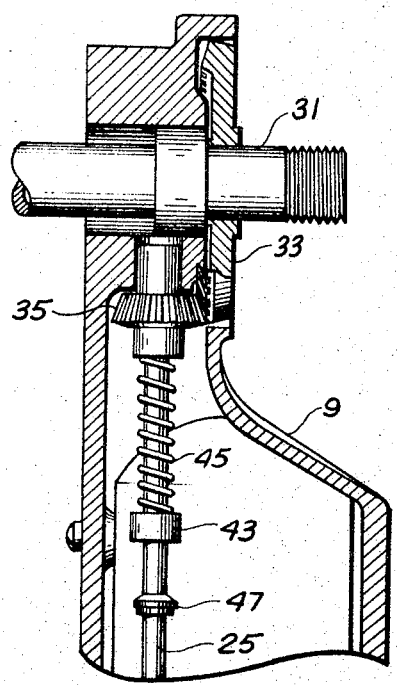
FIG. 3 is a front partial section of the mechanism showing the details of the gear arrangement.

The mechanical engagement of the milling machine table feed mechanism 7 with the hand feed control 3 can be understood with reference to FIGS. 2 and 3. The hand feed control 3 shown in FIG. 1 is connected to the milling machine table 1 by means of a driven shaft 31. The threaded end of the driven shaft 31 (FIG. 3) permits ready removal of the hand crank 4 for installation of the milling machine table feed mechanism 7. With the hand crank 4 removed from the driven shaft 31, the milling machine table feed mechanism 7 can be positioned on the driven shaft 31 and bolted to the end of the milling machine table 1. A driven gear 33 is then positioned on and affixed to the driven shaft 31. The driven gear 33 has a set of bevelled teeth located on one side of it is as shown in FIG. 3. With the driven gear 33 installed on the driven shaft 31, The hand crank 4 can be replaced on the driven shaft 31 to complete the installation.

A bevelled drive gear 35 is affixed to the gear shaft 25 on the opposite end from the step-down gear 23. The drive gear 35 is movable into and out of engagement with the driven gear 33 as the shaft 25 moves up and down. An associated lever bar 37 at one end 39 slidably engages the gear shaft 25 and is pivoted to rotate about the point 41 as shown in FIG. 2. A lift collar 43 is slidably mounted so that it can move axially along the gear shaft 25. An engaging spring 45 extends between the lift collar 43 and the drive gear 35. A return collar 47 is affixed to the gear shaft 25 on the under side of the bar 37. Pivoting the bar 37 upward lifts the collar 43 which compresses the engaging spring 45 and in turn urges the gear 35 and the gear shaft 25 toward the engagement position. The engaging spring 45 advantageously absorbs the relative displacement between the bar 37 and the gear 35 when the former is lifted by the movement of the control lever 15 out of its neutral position. In this manner, greater freedom is realized in the tolerances which are permissible with respect to the spacing of the various elements than if direct, unyielding contacts were required to be maintained between the elements. Also, the spring 45 permits the control lever 15 and the associated bar 37 to be moved to an engaged position, even though the gears 35 and 33 may be so positioned relative to each other that engagement is blocked, as by having the teeth of the respective gears abutting each other. This condition is only momentary, since the gear 35 rotates as soon as the motor 19 is energized and rotation of the gear 35 permits the teeth of the two gears 35 and 33 to mesh so that the gear 35 may move upwardly into full engagement under the urging of the engaging spring 45.

When the drive gear 35 is to be disengaged, that is, retracted, from the gear 33, the control lever 15 is restored to its neutral position, permitting the bar 37 to pivot to its downward position under the influence of a disengaging spring 48 which is connected between the bar 37 and the mounting bracket 29. The end 39 of the bar 37 bears against the return collar 47 affixed to the gear shaft 25 and retracts the shaft 25 and gear 35.

Figure 4:
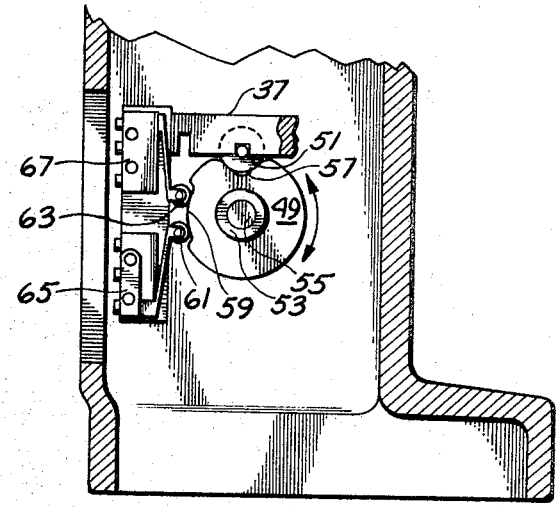
FIG. 4 is a front partial section of the mechanism showing the operative details of the cam.

Details of the camming mechanism which couples the control lever 15 to the lever bar 37 and the motor drive circuit may be better seen in FIG. 4. The cam 49 is coupled to the control lever 15 by means of a hollow shaft 53 and is shown having a notch or recess 57 between adjacent circumferential surfaces at an outer radius. A cam follower 51 secured to the bar 37 is positioned to rest within the notch 57 and roll along the outer circumferential surfaces of the cam 49 as the cam is rotated. The cam 49 also serves to control the condition of associated microswitches 65 and 67 by virtue of a second recess 59 at the left of the cam 49 (as it is shown in FIG. 4) which is arranged to receive actuating rollers 61 and 63 of the microswitches 65 and 67 respectively. Only one of the microswitches 65, 67 is actuated at any given time when the cam 49 is rotated out of the neutral position shown in FIG. 4, and the particular microswitch which is actuated depends upon the direction of rotation of the cam 49. The microswitches 65, 67 are connected in the motor circuit and serve to control the direction of rotation of the motor 19 when the control lever 15 is rotated out of its neutral position to cause engagement of the gears 33, 35 and actuation of the motor 19 in the desired direction.

As will be explained further in connection with the description of FIG. 5, motor speed may be controlled by a potentiometer 85 and the hand control for that potentiometer is brought out to the front of the mechanism via a shaft 55 extending through the hollow shaft 53 and the cam 49. The potentiometer control knob 17 is affixed to the outer end of the potentiometer shaft 55. The potentiometer 85 is positioned on the inner end of the shaft 55 in a conventional manner, but it has been omitted from the view of FIG. 2 for purposes of simplicity. By means of the described arrangement, both the control lever 15 and the speed control knob 17 are conveniently and readily accessible to the operator of the associated machine without the need of complicated gearing and coupling arrangements.

Figure 5:
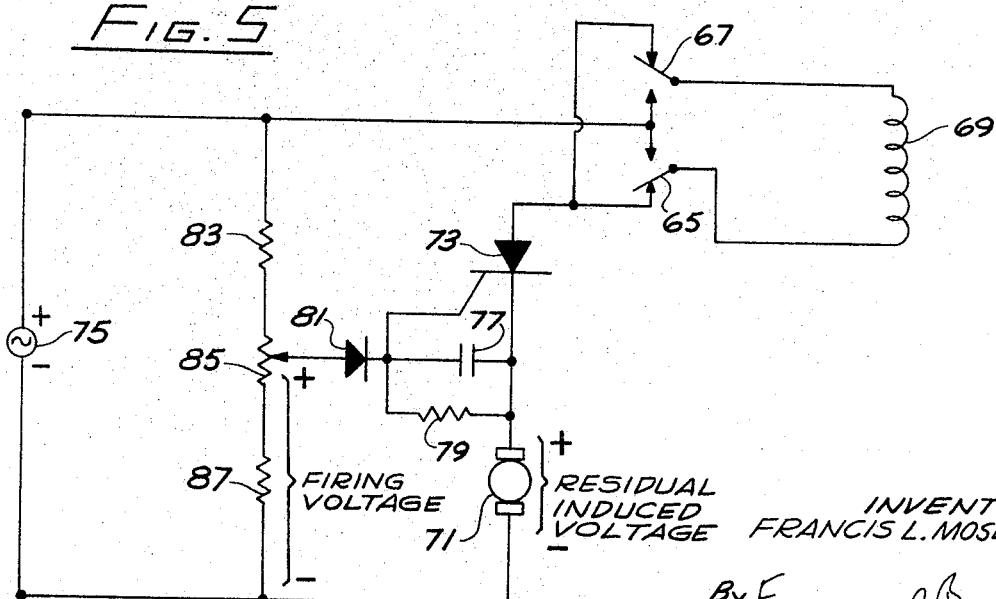
FIG. 5 is an electrical schematic of a motor control circuit for the mechanism.

The drive circuit for the motor 19 is shown in FIG. 5 in schematic form as comprising a motor field winding 69 and a motor armature 71 both in series with a silicon controlled rectifier 73 (SCR). An alternating current source 75 for the circuit can pe provided by plugging the circuit into an electrical wall receptacle or connecting it to any other suitable power source. When the source 75 assumes the polarity shown in FIG. 5 it is deemed to be in a positive half-cycle for purposes of this discussion. A time constant circuit consisting of a capacitor 77 and a resistor 79 is connected along with a diode 81 between the motor-SCR series circuit and a series voltage divider circuit consisting of a resistor 83, a potentiometer 85 and a resistor 87. The motor direction is controlled by connecting the microswitches 65 and 67 between the motor field 69 and the alternating current source 75 so that the polarity of the motor field 69 is dependent upon closure of the selected microswitch.

Speed control of the motor is achieved by varying the conduction angle of the SCR 73. When conduction is initiated at a point determined by the motor speed, a regulated speed control results. Depending upon the speed and load of the motor, a residual induced voltage from the motor field 69 appears across the motor armature 71. This induced voltage is positive on the timing circuit side of the motor armature 71 and tends to buck any current coming into the motor armature 71 from the timing circuit. Therefore only when the potentiometer 85 becomes more positive than the motor armature 71 will the armature permit a current to flow through the diode 81 to fire the SCR 73. The potential of the potentiometer 85 with respect to the bottom leg of the circuit is termed the firing voltage. The resistors 83 and 87 determine the portion of the source voltage which appears across the potentiometer 85, and the setting of the potentiometer 85 determines the firing voltage within the range of the potentiometer voltage. The diode 81 blocks current from the SCR 73 until the firing voltage exceeds the residual induced voltage across the motor armature 71, at which point the SCR 73 is fired to apply source voltage to the armature 71. This variation in the firing angle of the SCR 73 in accordance with the speed of the motor and the setting of the potentiometer advantageously provides a regulated control of motor speed.

Although there has been described one specific arrangement of a milling machine table feed mechanism in accordance with the invention for the purposes illustrating the manner in which the invention may be used to advantage, it will be appreciated that the invention is not limited thereto. Accordingly, any and all modifications, variations or equivalent arrangements falling within the scope of the annexed claims should be consideed to be a part of the invention.

I claim:

1. A gear driven mechanism comprising a first gear movable into and out of engagement with a second gear, a control lever for moving the first gear into contact with the second gear, means coupled to the control lever for urging the first gear into engagement with the second gear when it becomes aligned, therewith, a reversible motor coupled to drive the first gear, and rotate in a selected direction when the control lever is operated to move the gears into contact.

2. A gear drive mechanism comprising a drive gear movable into and out of engagement with a driven gear, a reversible motor coupled to the drive gear, a control lever for selecting between engaged and disengaged positions of the drive gear, means coupled between the control lever and the drive gear for moving the drive gear to a disengaged position for one position of the control lever and for urging the drive gear toward engagement with the driven gear for another position of the control lever and switching means responsive to the moving means for energizing the motor upon placement of the control lever in said other position.

3. The mechanism of claim 2 wherein the control lever is arranged to select between left, neutral and right positions and the switching means are connected to energize the motor for rotation in a first direction when the control is in the left position and in a second direction when the control is in the right position.

4. The mechanism of claim 3 further including means for selectively varying the speed of the motor and for causing the motor to rotate at a selected speed when energized by the switching means.

5. A gear drive mechanism comprising a drive gear movable into and out of engagement with a driven gear, a reversible motor coupled to the drive gear, a control lever for selecting between engaged and disengaged positions of the drive gear, a rotatable cam coupled to the control lever, plural switching means selectively actuable by the cam for energizing the motor, in a selected direction of rotation and means coupling the drive gear to the cam for moving the drive gear to a disengaged position for one position of the cam and for moving the drive gear into engagement with the driven gear for another position of the cam.

6. A power driven mechanism for attachment to a hand driven shaft of a machine comprising a driven gear arranged to be attached to said shaft, a drive gear movable into and out of engagement with the driven gear, a mounting plate adapted to encase said gears and attach the mechanism to the machine, a control lever movable between a plurality of positions, a cam attached to the control lever, a pivoted bar positioned to follow a first portion of the cam surface when the control lever is moved from one position to another, means connecting the bar directly to a drive gear for disengaging the drive gear from the driven gear, a spring connecting the bar to the drive gear for urging the drive gear into engagement with the driven gear, a reversible motor coupled to drive said gears in a selected direction, and switching means connected in circuit with the motor for energizing the motor to rotate in a selected direction, said switching means being actuable alternatively by a second portion of the surface of said cam.

7. A mechanism in accordance with claim 6 further including adjustable speed control means for determining the speed of rotation of said motor upon actuation by the switching means.

8. A drive mechanism comprising a driven gear, a movable shaft, a drive gear connected to the shaft and engageable or disengageable from the driven gear in accordance with movements of the shaft, a motor coupled to the shaft, a spring slidably mounted on the shaft, a control lever for selecting between engaged and disengaged positions of the drive gear, means coupled between the control lever and the spring for moving the drive gear to a disengaged position for one position of the control lever and for urging the drive gear toward engagement with the driven gear for another position of the control lever and switching means responsive to the moving means for energizing the motor upon placement of the control lever in said other position.

9. A gear drive mechanism comprising a first gear movable into and out of engagement with a second gear; a shaft supporting said first gear and movable axially with said gear; a reversible electric motor coupled to drive said shaft and gear; a first collar slidably mounted on said shaft; a spring extending between said first collar and said first gear; a second collar affixed to said shaft; a pivoted bar positioned between said first and second collars for moving said shaft axially; a pair of switches connected respectively to actuate said motor for rotation in one of two opposite directions; a control lever movable between neutral, left and right positions for controlling the operation of the drive mechanism; a cam affixed to said control lever for rotation therewith and having a first surface for lifting said bar to urge said first gear into engagement with the second gear when said control lever is moved to either the left or right position and having a second surface operable to selectively actuate one of said switches when the control lever is rotated to either the left or right position, said surfaces permitting the retraction of the drive gear and the release of both said switches when the control lever is placed in the neutral position; and a second spring for retracting the pivoted bar when the control lever is moved to the neutral position.

References Cited

UNITED STATES PATENTS

| 2,086,830 | 7/1937 | Thompson | 74—472 |
| 2,495,865 | 1/1950 | Perkins | 74—405 |
| 3,134,273 | 5/1964 | Wardlaw | 74—625 |

DONLEY J. STOCKING, *Primary Examiner.*

H. S. LAYTON, *Assistant Examiner.*